US012650599B2

(12) United States Patent
Chriki et al.

(10) Patent No.: US 12,650,599 B2
(45) Date of Patent: Jun. 9, 2026

(54) OPTICAL SYSTEM FOR INCREASING THE FIELD OF VIEW OF NEAR-EYE DISPLAYS

(71) Applicant: Lumus Ltd., Ness Ziona (IL)

(72) Inventors: Ronen Chriki, Lod (IL); Eitan Ronen, Rechovot (IL); Elad Sharlin, Mishmar David (IL)

(73) Assignee: Lumus Ltd., Ness Ziona (IL)

( * ) Notice: Subject to any disclaimer, the term of this patent is extended or adjusted under 35 U.S.C. 154(b) by 186 days.

(21) Appl. No.: 18/555,520

(22) PCT Filed: Mar. 21, 2022

(86) PCT No.: PCT/IB2022/052561
§ 371 (c)(1),
(2) Date: Oct. 14, 2023

(87) PCT Pub. No.: WO2022/229723
PCT Pub. Date: Nov. 3, 2022

(65) Prior Publication Data
US 2024/0036333 A1 Feb. 1, 2024

Related U.S. Application Data

(60) Provisional application No. 63/181,276, filed on Apr. 29, 2021.

(51) Int. Cl.
*G02B 27/01* (2006.01)
*G02B 5/18* (2006.01)
*G02B 27/28* (2006.01)

(52) U.S. Cl.
CPC ....... *G02B 27/0172* (2013.01); *G02B 5/1819* (2013.01); *G02B 27/28* (2013.01); *G02B 2027/0123* (2013.01)

(58) Field of Classification Search
CPC .......... G09G 3/02–025; G09G 3/3473; G09G 2320/028; G02B 5/18–1823;
(Continued)

(56) References Cited

U.S. PATENT DOCUMENTS 5,870,159 A 2/1999 Sharp
7,643,214 B2 1/2010 Amitai
(Continued)

FOREIGN PATENT DOCUMENTS

CN 104570353 4/2015
CN 108107579 2/2021
(Continued)

OTHER PUBLICATIONS

Miaomiao Xu et al., "Methods of optimizing and evaluating geometrical lightguides with microstructure mirrors for augmented reality displays", Opt. Express, (Feb. 18, 2019), vol. 27, pp. 5523-5543, XP055779991 [A] 1-22 DOI: http://dx.doi.org/10.1364/OE.27.005538.
(Continued)

*Primary Examiner* — Keith L Crawley
(74) *Attorney, Agent, or Firm* — Renner, Otto, Boisselle & Sklar, LLP

(57) ABSTRACT
A method for generating an image in a near-eye display may include dividing an image into first and second sub-images, sequentially transmitting the first sub-image and the second sub-image through a channel, extracting light corresponding to the first sub-image in a first polarization and light corresponding to the second sub-image in a second polarization, deflecting a first order of the light in the first polarization in a first direction, and deflecting an opposite order of the light in the second polarization in a opposite direction different from the first direction. The resulting image width corresponding to a wider field of view.

12 Claims, 9 Drawing Sheets

(58) Field of Classification Search

CPC ........... G02B 5/30–3066; G02B 6/0011–0056; G02B 6/105; G02B 27/0081; G02B 27/01–0101; G02B 27/017–0172; G02B 27/28–288; G02B 27/4227; G02B 27/4261; G02B 2027/0123–0125; G02B 2027/0178

See application file for complete search history.

(56) References Cited

U.S. PATENT DOCUMENTS

| | | | |
|---|---|---|---|
| 7,724,442 | B2 | 5/2010 | Amitai |
| 8,320,032 | B2 | 11/2012 | Levola |
| 9,377,623 | B2 | 6/2016 | Robbins et al. |
| 9,494,799 | B2 | 11/2016 | Robbins et al. |
| 9,766,463 | B2 | 9/2017 | Border et al. |
| 10,133,070 | B2 | 11/2018 | Danziger |
| 10,168,531 | B1 | 1/2019 | Trail et al. |
| 10,209,517 | B2 | 2/2019 | Popovich et al. |
| 10,520,731 | B2 | 12/2019 | Amitai et al. |
| 10,551,622 | B2 | 2/2020 | Robbins et al. |
| 10,678,116 | B1 * | 6/2020 | Lam ......................... G06F 3/017 |
| 10,816,809 | B2 | 10/2020 | Kim et al. |
| 11,327,312 | B2 | 5/2022 | Robaina et al. |
| 11,450,113 | B1 | 9/2022 | Vaziri |
| 11,561,510 | B1 * | 1/2023 | Maimone ........... G02B 27/4261 |
| 2013/0077049 | A1 | 3/2013 | Bohn |
| 2014/0036361 | A1 | 2/2014 | Woodgate et al. |
| 2014/0098010 | A1 | 4/2014 | Travis |
| 2015/0185475 | A1 | 7/2015 | Saarikko et al. |
| 2015/0205126 | A1 | 7/2015 | Schowengerdt |
| 2015/0253573 | A1 * | 9/2015 | Sako ..................... H04N 13/398 345/207 |
| 2015/0289762 | A1 | 10/2015 | Popovich et al. |
| 2015/0378515 | A1 | 12/2015 | Powell |
| 2016/0033698 | A1 | 2/2016 | Escuti et al. |
| 2016/0085300 | A1 | 3/2016 | Robbins et al. |
| 2016/0253934 | A1 | 9/2016 | Wu |
| 2018/0045960 | A1 | 2/2018 | Palacios et al. |
| 2018/0113309 | A1 * | 4/2018 | Robbins ............... H04N 13/337 |
| 2018/0188631 | A1 | 7/2018 | Lu et al. |
| 2018/0232048 | A1 | 8/2018 | Popovich et al. |
| 2018/0239177 | A1 * | 8/2018 | Oh ........................ G02B 6/0088 |
| 2018/0246336 | A1 | 8/2018 | Greenberg |
| 2018/0284440 | A1 | 10/2018 | Popovich et al. |
| 2018/0284884 | A1 | 10/2018 | Sulai et al. |
| 2018/0292592 | A1 | 10/2018 | Danziger |
| 2018/0335629 | A1 | 11/2018 | Cheng et al. |
| 2019/0026864 | A1 | 1/2019 | Chen et al. |
| 2019/0056600 | A1 | 2/2019 | Danziger et al. |
| 2019/0171285 | A1 | 6/2019 | Sulai et al. |
| 2019/0187482 | A1 | 6/2019 | Lanman et al. |
| 2019/0369403 | A1 | 12/2019 | Leister |
| 2020/0089319 | A1 | 3/2020 | Popovich et al. |
| 2020/0117006 | A1 | 4/2020 | Kollin et al. |
| 2020/0225475 | A1 | 7/2020 | Muenz |
| 2020/0233214 | A1 | 7/2020 | Jia et al. |
| 2020/0333606 | A1 | 10/2020 | Popovich et al. |
| 2020/0341269 | A1 | 10/2020 | Mills et al. |
| 2021/0033872 | A1 | 2/2021 | Rubin et al. |
| 2021/0208407 | A1 * | 7/2021 | Eash .................. G02B 27/0172 |
| 2021/0247612 | A1 * | 8/2021 | Hudman .................. G02B 5/18 |
| 2021/0247613 | A1 | 8/2021 | Hudman |
| 2022/0066212 | A1 * | 3/2022 | Mceldowney ..... G02B 27/0172 |
| 2022/0091323 | A1 * | 3/2022 | Yaroshchuk ....... G02B 6/29304 |
| 2022/0121034 | A1 * | 4/2022 | Qin ........................... G02F 1/31 |

FOREIGN PATENT DOCUMENTS

| | | |
|---|---|---|
| CN | 112444970 | 3/2021 |
| EP | 3839607 | 6/2021 |
| JP | S61140925 | 6/1986 |
| WO | 2021/124315 | 6/2021 |
| WO | 2021191889 A1 | 9/2021 |
| WO | 2021220267 A1 | 11/2021 |
| WO | 2021079372 A9 | 4/2022 |

OTHER PUBLICATIONS

Fernandes, Diego et al., "Influence of temperature on the refractive index sensitivities of fiber Bragg gratings refractometers", Journal of Microwaves, Optoelectronics and Electromagnetic Applications, (Jun. 30, 2017), vol. 16, No. 2, pp. 385-392, XP055779992 [A] 6, 20-22 DOI: http://dx.doi.org/10.1590/2179-10742017v16i2785.

Jianming Yang et al., "Design of a large field-of-view see-through near to eye display with two geometrical waveguides", Optics Letters, US, (20161116), vol. 41, No. 23, doi: 10.1364/OL.41.005426, Issn 0146-9592, p. 5426, XP055383187 [Y] 1-3,8-22 * p. 5427; figures 1,2 * DOI: http://dx.doi.org/10.1364/OL.41.005426.

Jianming Yang et al., "Polychromatic see-through near-eye display design with two waveguides and a large field-of-view", Proceedings of SPIE; [Proceedings of SPIE ISSN 0277-786X vol. 10524], SPIE, US, (Apr. 29, 2016), vol. 9896, doi: 10.1117/12.2227383, ISBN 978-1-5106-1533-5, pp. 989605-989605, XP060071032 [A] 1-22 * figure 1 * * 2.1 Geometry of the system * DOI: http://dx.doi.org/10.1117/12.2227383.

Guanjun Tan et al., "Foveated imaging for near-eye displays," Opt. Express 26, Issue 19, pp. 25076-25085 (2018) DOI: https://doi.org/10.1364/OE.26.025076.

Tao Zhan et al., "Pancharatnam-Berry optical elements for head-up and near-eye displays [Invited]," J. Opt. Soc. Am. B 36, vol. 36, Issue 5, pp. D52-D65 (2019) DOI: https://doi.org/10.1364/JOSAB.36.000D52.

International Search Report and Written Opinion of the International Searching Authority for corresponding International Patent Application No. PCT/IB2022/052561, mailed Jun. 16, 2022.

* cited by examiner

OPTICAL SYSTEM FOR INCREASING THE FIELD OF VIEW OF NEAR-EYE DISPLAYS

This application is a national phase of International Application No. PCT/IB2022/052561, filed Mar. 21, 2022, which claims priority to U.S. Provisional Application No. 63/181, 276, filed Apr. 29, 2021, each of which is hereby incorporated herein by reference in its entirety.

Near-eye displays (NED) are now a staple in augmented reality (AR) and virtual reality (VR) applications. Augmented reality displays, for example, typically include a near-eye transparent or semi-transparent display through which a user may see the surrounding environment while simultaneously also seeing virtual objects (e.g., text, graphics, video, etc.) that appear as part of, and/or overlaid upon, the surrounding environment.

NED devices often utilize optical waveguides to reproduce displayed virtual images the user may see in the augmented reality environment. The waveguides often present limitations on the performance and/or form factor of such devices. Particularly, in NED devices that utilize optical waveguides, such as, for example, head mounted displays (HMD), light propagates through the optical waveguide over a limited range of internal angles. Light propagating at an angle of incidence to internal surfaces of the waveguide travels within the waveguide, bouncing back and forth between the surfaces, so long as the angle of incidence with respect to the surface normal is greater than some critical angle associated with the material from which the optical waveguide is made. Light propagating at other angles of incidence would escape the waveguide. Therefore, the angular width of light in NED devices using waveguides is inherently limited by the waveguides. These and other factors inherent to waveguides tend to limit the field-of-view (FOV) that can be supported by optical waveguide-based displays.

Attempts to increase the FOV of waveguide-based displays conventionally came with compromises in size. To improve FOV, designers had to make NED devices bulky and cumbersome, which are undesirable attributes for consumers. Therefore, there is a need in the art for NED with improved FOV that are also not bulky and cumbersome.

SUMMARY OF THE INVENTION

The present disclosure relates to optical systems for use in a NED having relatively wide FOV. In accordance with an embodiment, the optical system includes light-guide optical element (LOE) including a light-transmitting substrate. The light-transmitting substrate includes first and second major surfaces parallel to each other, one or more light input coupling elements configured to couple incident light into the light-transmitting substrate thereby trapping the light between the first and second major surfaces by total internal reflection, and one or more light output coupling elements configured to couple the light out of the substrate. In this embodiment, the optical system further includes a pair of complementary polarization gratings. A first polarization grating from the pair is disposed on a first side of the light-transmitting substrate corresponding to the first major surface and a second polarization grating from the pair is disposed on a second side of the light-transmitting substrate corresponding to the second major surface. In this embodiment, the optical system further includes at least one switching polarization element configured to switch polarization of the light between a first polarization and a second polarization different from the first polarization such that the second polarization grating deflects the light of the first polarization in a first direction and the light of the second polarization in a second direction different from the first direction.

The polarization gratings deflect polarized light from the image in two different directions according to a time-division multiplexed scheme. At a first time, a first sub-image light polarized in a first polarization is deflected in the first direction, and at a second subsequent time, a second sub-image light polarized in a second polarization is deflected in the second direction. The effective combination of the light deflected in the first direction and the light deflected in the second direction by time-division multiplexing expands the FOV of the image significantly.

This technique allows for the use of compact waveguides, projectors, etc. Therefore, the invention disclosed herein allows for improved FOV of NED without significantly increasing their size.

In one embodiment, the optical system includes a projector configured to emit polarized light in a direction centered normal to the first and second major surfaces.

In one embodiment, the at least one switching polarization element is disposed between the projector and the first major surface such that the incident light switches between the first polarization and the second polarization prior to coupling into the light-transmitting substrate.

In one embodiment, the at least one switching polarization element includes first and second switching polarization elements and the first switching polarization element is disposed between the LOE and the first polarization grating and the second switching polarization element is disposed between the LOE and the second polarization grating such that the incident light remains polarized in the first polarization as it couples into the light-transmitting substrate.

In one embodiment, the optical system includes a second pair of complementary polarization gratings, a third polarization grating from the second pair disposed on the first side of the light-transmitting substrate corresponding to the first major surface and a fourth polarization grating from the second pair disposed on the second side of the light-transmitting substrate corresponding to the second major surface. The at least one switching polarization element includes third and fourth switching polarization elements and the third switching polarization element is disposed between the first polarization grating and the third polarization grating and the fourth switching polarization element is disposed between the second polarization grating and the fourth polarization grating.

In one embodiment, the at least one switching polarization element includes first, second, and third switching polarization elements, the first switching polarization element is disposed between the LOE and the first polarization grating, the second switching polarization element is disposed between the LOE and the second polarization grating, and the third switching polarization element is disposed between the projector and the first polarization grating, the first switching polarization element configured to switch opposite the second and third switching polarization elements.

In one embodiment, the optical system includes a processor operably connected to the projector and the at least one switching polarization element and configured to time division multiplex polarization of the light between the first polarization and the second polarization at least once an image frame.

In one embodiment, the projector is configured to project an image frame divided into at least two sub-frames and the optical system includes a processor operably connected to the projector and the at least one switching polarization element and configured to time division multiplex polarization of the light between the first polarization and the second polarization synchronized to projection of a first sub-frame and a second sub-frame, respectively, from the at least two sub-frames.

In one embodiment, the projector is configured to project polychromatic images in which light of a first color is projected with a different field of view from light of a second color different from the first color. In one embodiment, the first polarization grating splits unpolarized light incident thereon into orthogonal polarizations, the orthogonal polarizations are incident on the first major surface, propagate through the substrate, and are incident on the second polarization grating which deflects the orthogonal polarizations into light that has an angular direction equal to the light incident on the first polarization grating.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
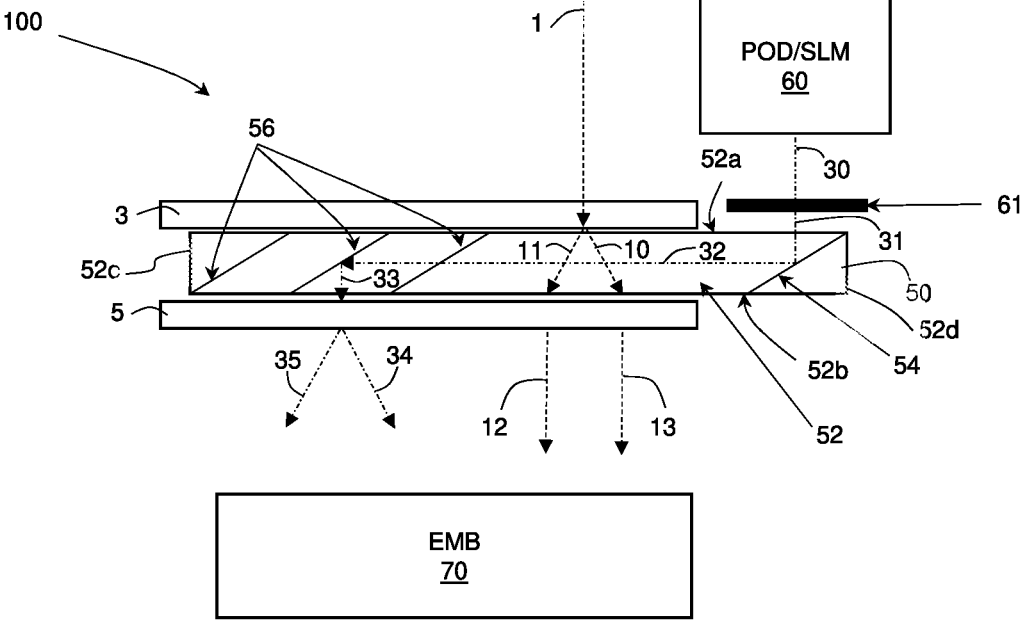
FIG. 1 illustrates a schematic diagram of an exemplary optical system for a near-eye display (NED).

FIG. 1 illustrates a schematic diagram of an exemplary optical system 100 for a near-eye display (NED).

The optical system 100 includes a light-guide optical element (LOE) 50. Examples of LOE 50 are described in significant detail in, for example, U.S. Pat. Nos. 7,643,214 and 7,724,442 to Amitai. The LOE 50 includes a light-transmitting substrate 52 having first and second major surfaces 52a, 52b parallel to each other and edges 52c, 52d. The first major surface 52a is also described herein as the front major surface or the front surface and elements related to the major surface 52a are also described as relating to the front. Similarly, the second major surface 52b is sometimes described herein as the back major surface or the back surface and elements related to the major surface 52b are also described as relating to the back. This is because, in NED applications, the front major surface 52a and related elements are disposed in the front of the NED lens, away from the user's eye, while the back major surface 52b and its related elements are disposed in the back of the NED lens near the user's eye. The LOE 50 also includes a plane surface 54 that is non-parallel to the first and second major surfaces 52a, 52b. The surface 54 couples light (represented by ray 31) incident thereupon into the light-transmitting substrate 52. The surface 54, may be reflective or diffractive and, thus, may reflect or diffract the light 31 (reflection represented by ray 32) and thereby trap the light between the first and second major surfaces 52a, 52b by total internal reflection. Although in the illustrated embodiment, the surface 54 is used as the light input coupling element, in other embodiments, light may be coupled into the LOE using light input coupling elements other than or in addition to reflective or diffractive surfaces such as the surface 54. For example, the edges 52c, 52d may be used as light input coupling elements. That is, light may be injected directly into the LOE 50 at one or more of the edges 52c, 52d. In another example, light may be coupled into the LOE 50 using refractive techniques and, thus, the light input coupling elements may include refractive elements.

The LOE 50 may also include one or more light output elements. In the illustrated embodiment, the LOE 50 includes as light output elements multiple partially reflecting surfaces 56 that are non-parallel to the first and second major surfaces 52a, 52b. The surfaces 56 couple the light 32 out of the substrate 52 (output light represented by ray 33).

The optical system 100 also includes a pair of complementary polarization gratings 3, 5. The first polarization grating 3 is disposed on the front side of the light-transmitting substrate 52 corresponding to the first major surface 52a and the second polarization grating 5 is disposed on the back side of the light-transmitting substrate 52 corresponding to the second major surface 52b. Polarization gratings are optical devices used to deflect light as a function of the light's polarization. Examples of polarization sensitive gratings include gratings based on Pancharatnam-Berry phase (geometric phase). One specific example are gratings made by liquid crystal molecules, which may deflect light as a function of the light's circular polarization. Such gratings may produce opposite deflection angle to light with right hand circularly polarization (RHCP) and left hand circularly polarization (LHCP), and most often the polarization of the deflected light would be switched (rotated). That is, for such gratings, light of right hand polarization (RHCP) will result in light of left hand circularly polarization (LHCP) that has been deflected in a first direction, while light of left hand circularly polarization (LHCP) will result in light of right hand polarization (RHCP) that has been deflected in a second direction, different from the first direction. It should be noted that, although circular polarization gratings are used herein to accomplish light deflection, other polarization gratings, such as linear polarization gratings, can have different deflections for two orthogonal polarizations and may also be used in the systems disclosed herein. Furthermore, the polarized gratings can be realized in different methods, including but not limited to active or passive liquid crystal elements, polymers, subwavelength spatially varying gratings or spatially varying polarizers.

Figure 2A:
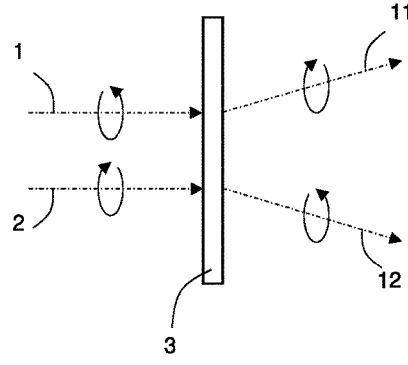
FIGS. 2A and 2B illustrate schematic diagrams exemplarily demonstrating polarizing grating pairs action.

As means of explanation, FIG. 2A illustrates a schematic diagram of a single circular polarization grating 3. A ray 1 of RHCP and a ray 2 of LHCP are incident on polarization grating 3. The polarization grating 3 deflects the rays 1, 2 according to their polarization state, and switches their polarization state, such that the ray 1 of RHCP is deflected to ray 11 with LHCP in one direction, and ray 2 with LHCP is deflected to ray 12 with RHCP in the opposite direction. Rays 11 and 12 are deflected to some diffraction order m and –m of the polarization grating 3. For incident unpolarized light, the polarization grating will act as a polarized beam splitter, where half of the incident intensity will be deflected to one direction with RHCP and the other half will be deflected to the opposite direction with LHCP.

Figure 2B:
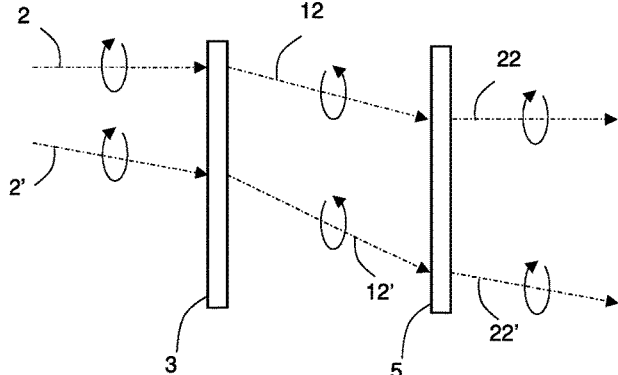

FIG. 2B illustrates a configuration of two complementary polarization gratings 3, 5 placed one after the other. The normally incident ray 2 and the obliquely incident ray 2', both with LHCP, are deflected by the polarization grating 3 to rays 12 and 12' with RHCP. Rays 12 and 12' then impinge the polarization grating 5 and propagate therethrough to the deflected rays 22 and 22' with RHCP. Rays 22 and 22' are deflected to the $0^{th}$ diffraction order of polarization grating 5, and therefore the angular orientations of these rays are the same as those of the incoming rays 2 and 2'. Although the deflection angle of diffraction grating depends on wavelength, since the orientation of rays 22 and 22' is the same as those of rays 2 and 2', no chromatic color breakage is expected for the transmitted image.

We note that some more exotic or unconventional polarization gratings may be designed such that the rays 11 and 12 would have the same polarization as the incoming rays 1 and 2, respectively. These elements could also be used in our method, if an additional waveplate would be included after each polarization grating, so as to rotate the polarization of rays 11 and 12. Alternatively, these elements could be used if they are designed to deflect light at an opposite direction from one another, i.e., that grating 3 deflects RHCP rays to some diffraction order m, and grating 5 deflects RHCP to the opposite diffraction order –m in the opposite direction. Physically, such gratings may be fabricated as conventional polarization gratings that rotate the polarization as the elements in FIG. 2A, but then also have another half wave plate that rotates the polarization to the original incoming polarization. We offer this explanation regarding more exotic/unconventional polarization gratings to show that the present invention is not limited to conventional polarization gratings.

Returning to FIG. 1, in the system 100, the polarization sensitive gratings 3 and 5 may be disposed on each side (front and back) of the LOE 50.

The exemplary system 100 also includes a projecting optical device (POD) 60 that may include a Spatial Light Modulator (SLM) such as a liquid crystal display (LCD), liquid crystal on silicon (LCOS) modulator, or a digital micromirror device of a digital light processing (DLP) system, an OLED array, or an inorganic LED array. Alternatively, it can contain a Laser Beam Scanning system (LBS). The POD 60 may generate a collimated image, i.e., the light of each image pixel is a parallel beam, collimated to infinity, with an angular direction corresponding to the pixel position within the image. The image illumination, thus, spans a range of angles corresponding to an angular field of view in two dimensions, all of which may be trapped within the LOE 50 by internal reflection and then coupled out. POD 60 includes at least one light source, typically LED or lasers, which may be deployed to illuminate the SLM, such as an LCOS chip. The SLM modulates the projected intensity of each pixel of the image, thereby generating the image. In the system 100, the POD 60 may generate a polarized wave of light at a first polarization.

The exemplary system 100 also includes the switching polarization element (SPE) 61, a device configured to controllably/dynamically switch or rotate polarization of light incident thereon from a first polarization to a second polarization different from the first polarization.

For example, the SPE 61 may be a device whose output light's polarization direction may be controlled as a function of applied voltage. In such case, the SPE 61 may be thought of as voltage-controlled wave plate. An example of such SPE 61 is a liquid crystal (LC) polarization rotator, a device that can rotate the polarization state of a linearly polarized input beam with no mechanical movement involved. Such an LC polarization rotator may consist of a liquid crystal variable retarder and a quartz zero-order quarter-wave plate. With linearly polarized light incident on the polarization rotator from the liquid crystal cell side, rotation of the output polarization can be achieved by adjusting the liquid crystal retardation. Liquid crystal retardation, in turn, may be controlled as a function of an applied voltage.

In other examples, the SPE 61 may be a device whose output light's polarization direction may be controlled as a function of other variables (e.g., current, sound, etc.) Thus, the SPE 61 may be an electro-optic, acousto-optic, etc. device or even a mechanically moving element that acts as a modulator to dynamically switch or rotate polarization of light incident thereon.

The system 100 may be presented in front of an Eye Motion Box (EMB) 70 corresponding to the location of user's eye relative to the NED in which the system 100 is installed.

In operation, the POD 60 projects light (represented by ray 30) that is polarized in a first polarization. The POD 60 will shine light beams in many directions (fields of view) but, for simplicity of explanation, the single ray 30 is shown. The light 30 propagates via the SPE 61, which may dynamically change the polarization of the light 30. In the illustrated embodiment, the output of the SPE 61 is the light 31, which is injected into the LOE 50 and coupled into the LOE 50 by the surface 54, becoming ray 32. The ray 32 is out coupled from the LOE 50 by the facets 56, becoming ray 33. Finally, the ray 33 propagates through the grating 5 and, depending on its polarization, is deflected towards a first direction or a second direction represented by rays 34 or 35, respectively. When the SPE 61 is operated to sequentially change polarization of the light 30 in synchronicity with the POD 60's projection of the image (at least one polarization switch per frame), the light 33 is respectively sequentially deflected in the first direction 34 and the second direction 35. Thus, by switching the polarization at SPE 61, the direction of FOV that reaches the EMB 70 may be changed.

At the same time, light 1 incident on the LOE 50 from the landscape view (the user's surroundings) is split by the grating 3 into rays 10 and 11 but will ultimately come out parallel to incoming ray 1 as rays 12 and 13 because of the complementary effect caused by grating 5. The result is that the landscape FOV is ultimately not altered by the system 100.

Although the principles of FOV deflection are disclosed herein in the context of LOE 50, a 1D expanding waveguide with reflecting facets, the system 100 may also be implemented using other type of waveguides such as, for example, waveguides with holographic gratings or diffraction gratings, liquid crystal waveguides, waveguides that expand the FOV in more than one dimension, and even systems with no waveguide like free form optics with beam splitters and birdbath or any other method used for NED. Although these principles are disclosed herein in the context of AR, the principles are equally applicable in VR applications (e.g., by removing landscape view elements such as front grating 3) and other NED applications.

Regarding sequential polarization of SPE 61 in synchronicity with POD 60's projection of the projected image, the projected image may be effectively divided into two sub-images, a first sub-image to be deflected to the direction of some diffraction order m (ray 34) and a second sub-image to be deflected to the opposite direction of the diffraction order –m (ray 35). For example, an AR system may display an image 30 with FOV of 20 degrees along the axis of deflection of the PG centered around the normal to the LOE 50 (normal to the major surfaces 52a, 52b). As explained above, controlling the SPE 61 to a first polarization P1 causes the polarization grating 5 to deflect the light 34 to the direction of diffraction order m=1 which is about +10 degrees. The P1 image would reach the eye (represented by the EMB 70) at an FOV distribution of angles of 0 to 20 degrees instead of the –10 to 10 degrees emerging from the LOE Changing the polarization to a second polarization P2 orthogonal to P1 would result in deflection of the light 35 to the direction of diffraction order m=–1 which is about –10 degrees. When the SPE 61 is operated to sequentially change polarization of the light in synchronicity with the POD 60's projection of the first sub-image and the second sub-image, the overall image perceived by the user would extend from –20 to 20 degrees, and FOV of 40 degrees, double the FOV of the original image. For simplicity of explanation, this description neglects the effect of dispersion. Dispersion effects are discussed below.

Figure 3:
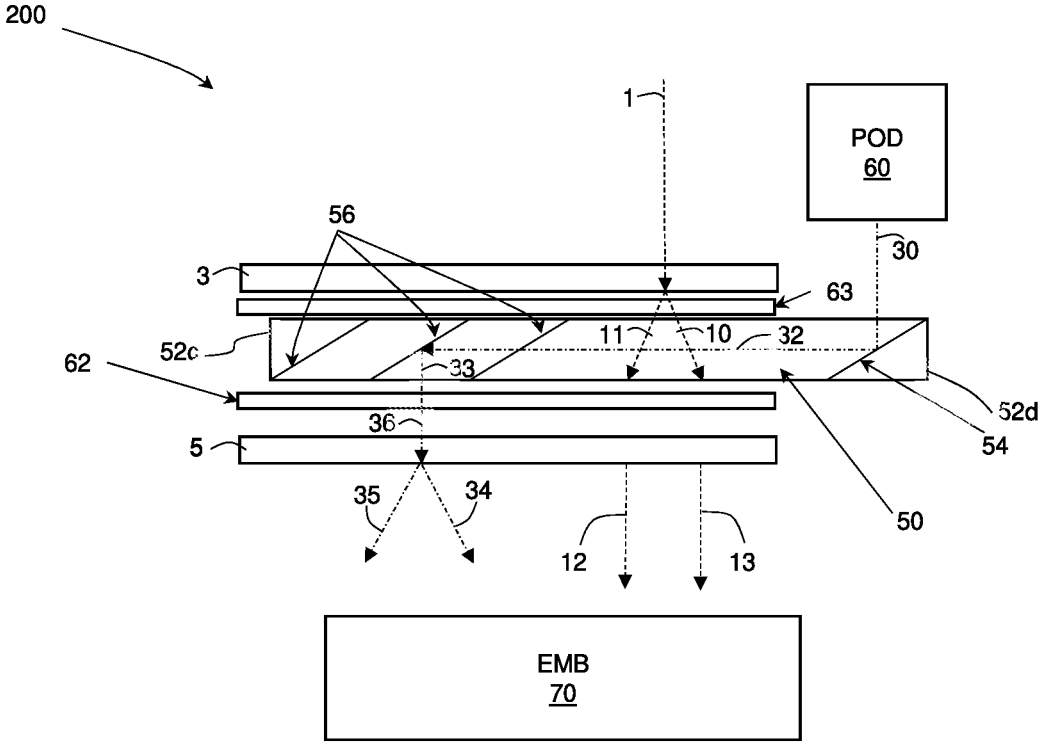
FIG. 3 illustrates a schematic diagram of another exemplary optical system for a NED.
Figure 4:
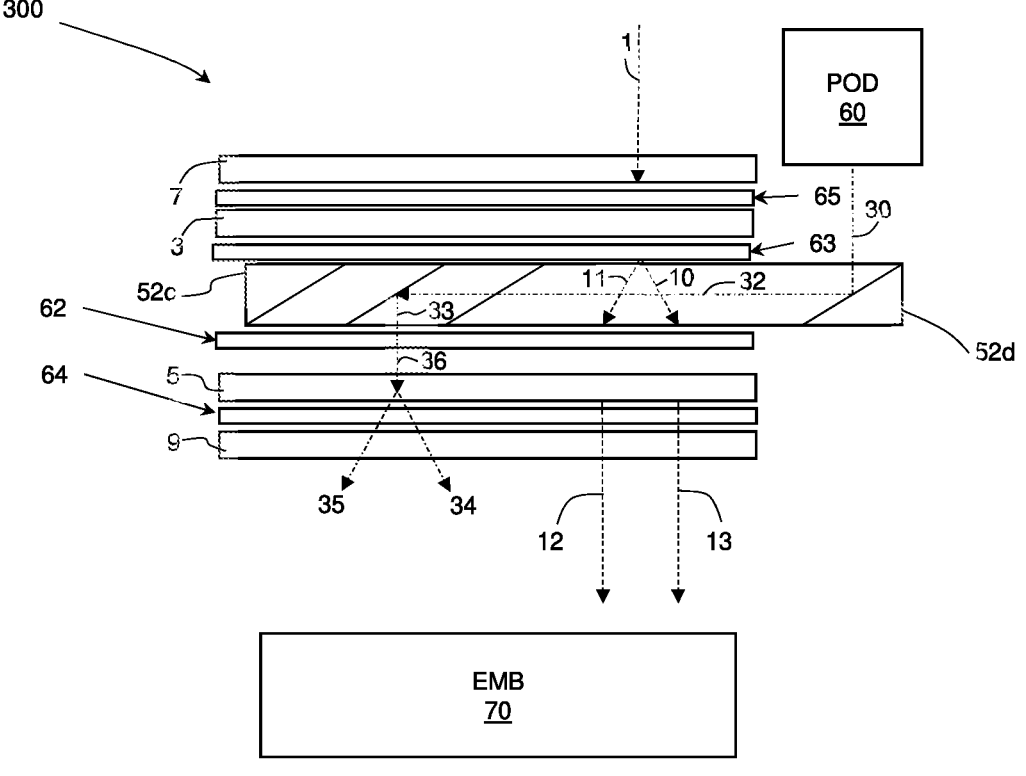
FIG. 4 illustrates a schematic diagram of yet another exemplary optical system for a NED.

FIGS. 3-5 illustrate other potential embodiments.

FIG. 3 illustrates a schematic diagram of an exemplary optical system 200 for a NED. Some waveguides and other NED systems cannot propagate or display light in two polarizations. In such cases, the system 200 may be used so that light that propagates through the LOE 50 is always in one polarization. In system 200, SPE 61 is no longer between the POD 60 and the LOE 50. Because of that, the rays 30, 32, and 33 are in a certain polarization (i.e., the first polarization) that does not dynamically change as the light propagates through the LOE 50. Instead of one SPE 61, the system 200 uses two SPE 62, 63. SPE 62 dynamically switches or rotates polarization of the incident light 33, resulting in light 36. Light 36, in turn, is incident on the grating 5 where, similar to the system 100, ray 36 is sequentially deflected into rays 34 and 35 depending on light 36's polarization.

Regarding the landscape view, SPE 63 is controlled in synchronicity with SPE 62 such that rays 12, 13 have the same angle as ray 1. Since rays 10 and 11 are transmitted by the internal structure of 50 which is generally polarization sensitive, SPE 63 is controlled in synchronicity with SPE 62 such that SPE 63 together with the internal structure of 50 cancels the effect of SPE 62. This way, light entering the system 200 as ray 1 first hits grating 3 and SPE 63 where it is changed but then hits SPE 62 and grating 5 where the effect is cancelled, resulting in rays 12, 13 at the same angle as ray 1. The result is that the landscape FOV is ultimately not altered by the system 200.

Some NED systems can display light only at linear polarizations. In cases where gratings 3 and 5 deflect angles corresponding to circular polarization a quarter wave plate (QWP) may be used as part of the grating structure to convert to linear polarization.

While the above examples describe embodiments with only one single deflection of the projected image at polarization grating 5, in other embodiments multiple successive deflections are possible by stacking together several polarization gratings and inserting SPE between them, as necessary.

FIG. 4 illustrates a schematic diagram of an exemplary optical system 300 for a NED. The system 300 may increase the FOV even further than the system 200 of FIG. 3. In FIG. 4, in addition to the gratings 3 and 5 and SPE 62 and 63 of the system 200 of FIG. 3, two additional gratings 7 and 9 and SPE 64 and 65 are introduced. The principle of operation is similar, however. Notably, grating pair 3, 5 will always have the complementary effect to each other. The same is true for grating pair 7, 9, they will always have the complementary effect to each other. Similarly, SPE pair 62, 63 will dynamically have the complementary SPE effect to each other and SPE pair 64, 65 will also dynamically have the complementary SPE effect to each other. This results in no change to the landscape FOV but may achieve controlled successive deflection of the projected image. The level of successive deflection may be controlled by controlling the SPE 62 and 64 individually to a first polarization P1 or a second polarization P2.

As an example, SPE 62 and 64 are both set to the first polarization P1, grating 5 deflects the light 36 by +10 degrees and grating 9 deflects the resulting light by an additional +5 degrees, resulting in a total deflection of +15 degrees. As another example, SPE 62 is set to the first polarization P1 and SPE 64 is set to the second polarization P2, grating 5 deflects the light 36 by +10 degrees and grating 9 deflects the resulting light by –5 degrees, resulting in a total deflection +5 degrees. Thus, by controlling the SPE to change the polarization at each grating, different deflections may be achieved. In the example system 300, the deflection as a function of the polarization at each grating is:

| | Grating 5/1$^{st}$ Polarization | Grating 5/2$^{nd}$ Polarization |
|---|---|---|
| Grating 9/1$^{st}$ Polarization | +15 | –5 |
| Grating 9/2$^{nd}$ Polarization | +5 | –15 |

Thus, the system 300 may be set in at least four different configurations and, if the native FOV of the system is 10 (+5 to –5) degrees, by time multiplexing as explained above the FOV of the system 300 can be controlled to cover the entire FOV between +20 to –20 degrees. The gratings could have the same deflection angles or even different directions of deflection and larger numbers of gratings are also envisaged. Also, although deflection is expressed above in discrete steps (e.g., 5, 10, 15, 20 . . . ), it may be possible to control FOV continuously, rather than merely discretely, by changing the polarization at the SPE continuously from the first polarization to the second polarization.

Generally, the deflection angle of the polarization grating is non-linearly dependent on the incident angle. Therefore, different fields of the projected image would be deflected by a different angle, and consequently the image will be distorted. It is therefore necessary to correct this distortion by projecting a distorted image that synchronously compensates for the non-linear response of the polarization grating.

For most gratings, the deflection angle is dependent on wavelength. Hence there may be advantages to using the techniques disclosed herein with single narrow wavelength light sources. For monochromatic systems, the FOV of the system could be $2\alpha$ and the deflection of the grating could be $\pm\alpha$ so that the resulting FOV would double to be $4\alpha$.

However, for most NED the light source is polychromatic (e.g., RGB), which would achieve different results.

For example, suppose an NED displays light in the red and blue wavelengths (630 and 450 nm). The red wavelength will be deflected at a certain angle, say a degrees, the blue light will be deflected only at ~0.7α degrees (under linear approximation). That means that the FOV for the blue light may be expanded only by 1.4α while the minimal width of the FOV is 2α. Thus, the resulting FOV would be ~3.4α. Thus, when dividing the image into different sub-images as described above, only ~85% of the image could be displayed in order to conserve FOV between all colors. For the color with the smaller deflection (generally the shorter wavelength), only ~85% could be displayed so as to prevent overlapping of the two images causing uneven brightness distribution. Furthermore, for colors with large deflection angles, only the inner 85% area could be displayed so as to prevent the larger deflection angle color's FOV to be wider than the FOV of the smaller deflection angle color.

Figure 5A:
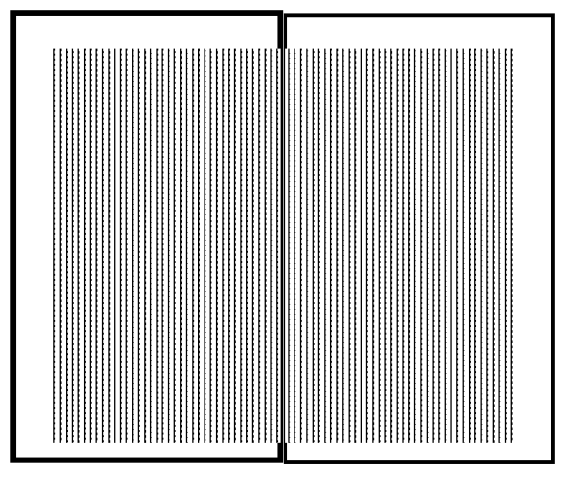
FIGS. 5A and 5B illustrate schematic diagrams demonstrating exemplary FOV for a NED.
Figure 5B:
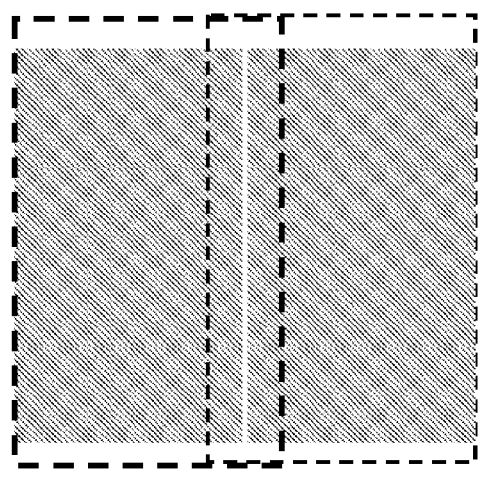

FIGS. 5A and 5B illustrate schematic diagrams demonstrating exemplary FOV for a NED. FIG. 5A illustrates FOV for red light while FIG. 5B illustrates FOV for blue light. In both FIGS. 5A and 5B the rectangles represent left and right FOV and the outer frame of the combined rectangles represents the width the NED can display. As shown in FIG. 5A, for red light, a relatively larger deflection results and the inner portions of the display are displayed on. This is shown by the inner portions of the rectangles being filled. As shown in FIG. 5B, for blue light, a relatively smaller deflection results and, thus, the outer part of the FOV is used instead. The external portion of the FOV is filled.

Using two or more grating pairs as shown in FIG. 4 could also help in enabling the deflection to become achromatic. Suppose that the NED shines light in the red and blue wavelengths (630 and 450 nm). Using a single grating pair as in FIG. 3, the red wavelength will be in a certain angle, say 8.5 degrees while the blue light will be deflected at smaller angles, say only at 5.95 degrees. Using two grating pairs as in FIG. 4, however, a second grating pair could be introduced with a smaller deflection angle of 1.5 degrees for the red and 1.05 for the blue, for example. If the second grating pair is tuned such that for the red light it deflects the light in the opposite direction of the first grating pair and for the blue light it deflects the light in the same direction as the first grating pair, then we get for both colors α=8.5−1.5=5.95+1.05=7. Deflection would be the same for both colors. Thus, by switching the effect of one grating between the red and blue image, less diffraction differences could be achieved.

In one embodiment, the RGB light sources are narrow bandwidth so as to decrease the chromatic aberration inside one single color sub-image. For example, the techniques disclosed herein may be implemented using light sources of full width at half maximum (FWHM) bandwidth less than 1 nm so as to have less than 1 minute of arc FOV dispersion for the red image around 633 nm.

Figure 6:
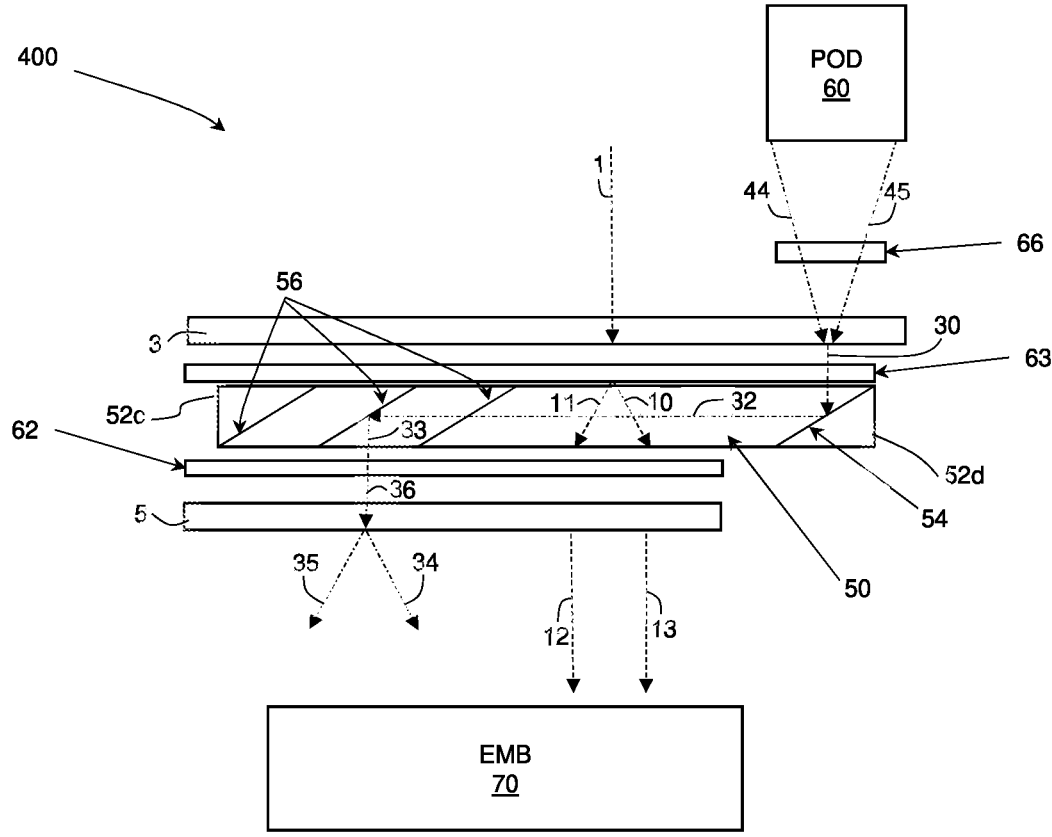
FIG. 6 illustrates a schematic diagram of yet another exemplary optical system for a NED.

Another way of overcoming the diffraction effect would be to use two gratings on the light from the POD 60, as is shown in FIG. 6.

FIG. 6 illustrates a schematic diagram of an exemplary optical system 400 for a NED. The illustrated configuration is similar to that shown in FIG. 3, except for the extension of grating 3 to receive light from POD 60 so that the projected image's light travels through both gratings 3 and 5. Other differences from FIG. 3 are the addition of SPE 66 at the exit of light from POD 60 and the extension of SPE 63 to between the extension of grating 3 and the LOE 50. Similar to system 200 of FIG. 3, in system 400, light coming out of POD 60 would pass grating 5, which deflects direction of that light according to its polarization. Here, however, the light first passes grating 3, which deflects the light so as to decrease its angular width. Eventually, the light reaching the EMB 70 (rays 34, 35) has the same angular width as the light coming out of POD 60 (rays 44, 45). However, inside the LOE 50 the angular distribution of light would be smaller (rays 30-33).

Typically, LOE such as the LOE 50 propagate light of only one polarization. Also, typically, POD such as the POD 60 will shine light only in one polarization. To address this, SPE 63 and 66 are introduced at the shown locations and controlled in synchronicity. This results in the polarization shifting needed for light deflection while maintaining constant polarization from the POD 60 and into the LOE 50.

In operation, polarized light 44, 45 from POD 60 is set to the first polarization or the second polarization by SPE 66. The grating 3 deflects the light so as to decrease its angular width. Because SPE 63 is operated opposite of SPE 66, the light entering the LOE 50 is in its original polarization from POD 60. Light travels through the LOE 50 (rays 30, 32, 33) and is coupled out. SPE 62 is operated to change the polarization of the LOE output light from the first polarization to the second polarization. Polarization grating 5 deflects the light to opposite directions according to its polarization.

In the present disclosure, the combination of polarization gratings and SPE are used to switch the action of the grating/SPE set (i.e., the SPE controls the polarization which results in the polarization grating deflecting light in one direction or another). Other potential structures may be used to accomplish similar results. For example, switchable gratings may be used. Switchable gratings are gratings that can dynamically turn on and off their optical effect, mainly part of a system that can dynamically deflect light. Such switchable gratings may be used in complementary pairs, as described above, resulting in dynamical complementary grating pairs, two gratings that cancel the effect of the other and can also be dynamically turned on and off.

Figure 7:
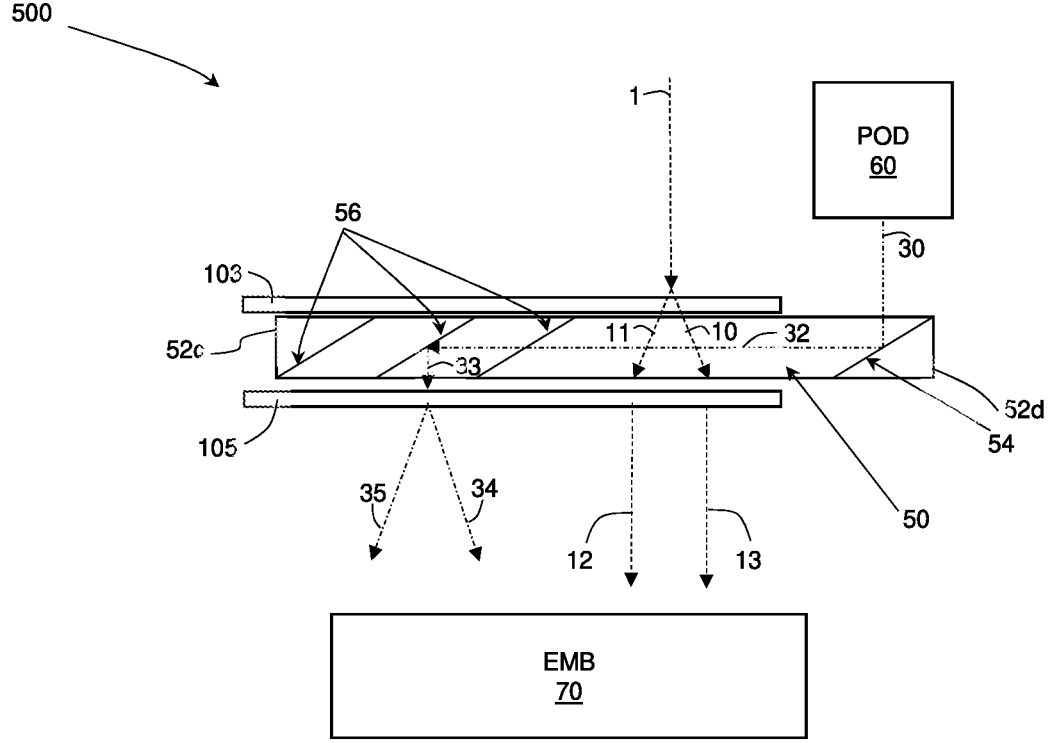
FIG. 7 illustrates a schematic diagram of yet another exemplary optical system for a NED.

FIG. 7 illustrates a schematic diagram of an exemplary optical system 500 for a NED. The system 500 is similar to the system 200 described above except that active transparent liquid crystal elements (such as SLMs and LCOSs) 103, 105 can be used instead of the SPE and polarization gratings. The element 105 can be used to apply a controlled linear phase on the incident polarized light represented by ray 33 so as to deflect the incoming fields to different angular orientations, resulting in deflected light represented by the rays 34, 35. Such an element 105 can be used to deflect time-dynamically the incident light in two or more angular orientations. A similar, complementary second element 103 can be placed before the waveguide 50 to compensate for the effect of the first element 105, such that the transmitted scene would not be distorted.

Methods

Figure 8:
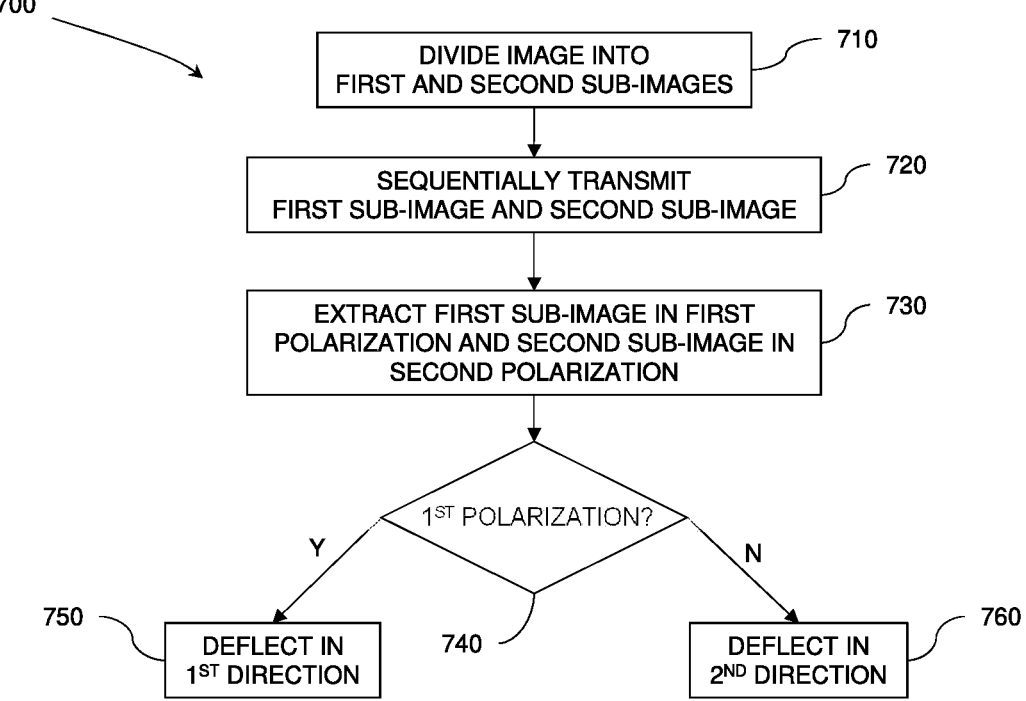
FIG. 8 illustrates a flow diagram for an exemplary method for generating an expanded FOV image in a NED.

Exemplary methods may be better appreciated with reference to the flow diagram of FIG. 8. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology.

Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 8 illustrates a flow diagram for an exemplary method 700 for generating an image in a NED. At 710, the method 700 may include dividing an image to be projected by the NED into first and second sub-images. For example, motion pictures consist of a series of still images referred to as frames. A frame may be effectively divided into two or more sub-frames. That is, the same frame image may be transmitted first in sync with the first polarization and second in sync with the second polarization, and so on. This step may also include calculation and implementation of the required correction distortions that must be applied to the sub-images to correct or compensate for the resulting chromatic aberrations and non-linear deflection as a function of incident angle (for a given color).

At 720, the method 700 includes sequentially transmitting the first sub-image and the second sub-image through a channel. The channel may be, for example, an LOE such as the LOE 50 described above. The method 700 may also include, at 730, extracting light corresponding to the first sub-image in the first polarization and light corresponding to the second sub-image in the second polarization. For example, SPE may be used to dynamically control the polarization of light as described above.

At 740, if light is in the first polarization, the method 700, at 750, deflects a first order of the light in the first polarization in a first direction. However, if light is in the second polarization, at 760, a first order of the light is deflected in the second polarization in a second direction different from the first direction. For example, a polarization grating may be used to deflect light in the first polarization in the first direction and light in the second polarization in the second direction. Although in the illustrated embodiment, the image or frame is effectively divided into two sub-images, in other embodiments, any image or frame may be divided into more (e.g., four, six, etc.) sub-images. That is, the same frame image may be transmitted first in sync with the first polarization, second in sync with the second polarization, third in sync with the first polarization (or some other polarization), fourth in sync with the second polarization (or some other polarization), and so on. Dividing an image into sub-images does not necessarily change the original timing or length of the image or frame. Dividing an image into sub-images means that the image may be transmitted for its original time but for some of that time the image is transmitted in sync with the first polarization, for some of the time the image is transmitted in synch with the second polarization, and so on.

In one embodiment, deflecting the light includes a back polarization grating receiving the extracted light and deflecting the light in the first polarization in the first direction and the light in the second polarization in the second direction.

In one embodiment, the method further includes, concurrently with extracting and deflecting the light, transmitting unpolarized light incident on a front polarization grating through the front polarization grating, the channel, and the back polarization grating such that the unpolarized light exits the back polarization grating having an angular direction equal to the unpolarized light as it was incident on the front polarization grating.

In one embodiment, the light corresponding to the first sub-image in the first polarization and the light corresponding to the second sub-image in the second polarization are transmitted through the LOE sequentially in a time-division multiplexing scheme.

In one embodiment, sequentially transmitting the first sub-image and the second sub-image includes time division multiplexing polarization of the light between the first polarization and the second polarization at least once an image frame.

In one embodiment, sequentially transmitting the first sub-image and the second sub-image includes time division multiplexing polarization of the light between the first polarization and the second polarization synchronized to projection of the first sub-image and the second sub-image, respectively.

In one embodiment, the light corresponding to the first sub-image and the light corresponding to the second sub-image are transmitted through the LOE in a common polarization and polarization of the light corresponding to the first sub-image in the first polarization or polarization of the light corresponding to the second sub-image in the second polarization occurs thereafter.

In one embodiment, deflecting of the light in the first polarization and deflecting of the light in the second polarization occurs in steps with multiple deflections amounting to the total deflection.

In one embodiment, sequentially transmitting the first sub-image and the second sub-image includes projecting polychromatic images in which light of a first color is projected with a different field of view from light of a second color different from the first color.

While the figures illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed, and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

System

Figure 9:
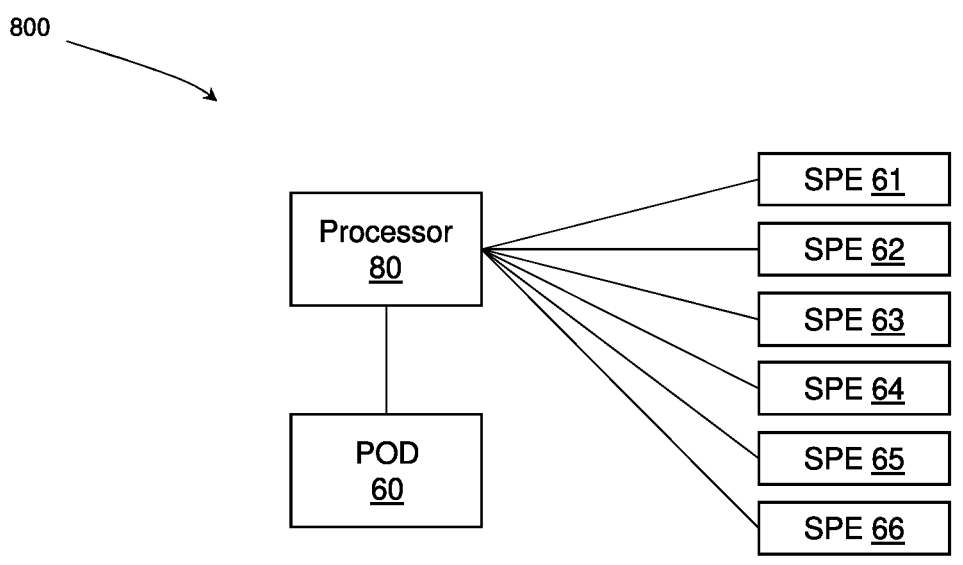
FIG. 9 illustrates a block diagram of an exemplary system for expanded FOV in a NED.

FIG. 9 illustrates a block diagram of an exemplary system 800 for a NED. The system 800 may include a processor 80 such as, for example, a microprocessor, microcontroller, etc.

The processor 80 may be operably connected to the POD 60 and applicable ones of the SPE 61-66 as described in the systems 100, 200, 300, and 400 described above. The processor is configured to control or at least orchestrate projection of images together with the POD 60 and to control the SPE 61-66 to the first polarization or the second polarization to implement the time-division multiplexing scheme described above.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. An optical system for a near-eye display (NED), the optical system comprising:
  a light-guide optical element (LOE) including a light-transmitting substrate having:
    first and second major surfaces parallel to each other, one or more light input coupling elements configured to couple incident light into the light-transmitting substrate thereby trapping the light between the first and second major surfaces by total internal reflection, and one or more light output coupling elements configured to couple the light out of the substrate through the second major surface, wherein the one or more light output coupling elements include partially reflective surfaces that are oriented non-parallel with respect to the first and second major surfaces;
  a pair of polarization gratings different from the one or more light output coupling elements, a first polarization grating from the pair disposed on a first side of the light-transmitting substrate corresponding to the first major surface and a second polarization grating from the pair disposed on a second side of the light-transmitting substrate corresponding to the second major surface, the second polarization grating disposed between the one or more light output coupling elements and a location corresponding to an eye of a user of the NED;
  at least one switching polarization element configured to switch polarization of the light from a first polarization to a second polarization different from the first polarization such that the second polarization grating deflects the light of the first polarization in a first direction and the light of the second polarization in a second direction different from the first direction;
  a projector configured to emit the incident light, the projector configured to project an image frame divided into at least two sub-frames; and
  a processor operably connected to the projector and the at least one switching polarization element and configured to time division multiplex polarization of the light between the first polarization and the second polarization synchronized to projection of a first sub-frame and a second sub-frame, respectively, from the at least two sub-frames,
  wherein the projector is further configured to project polychromatic images in which light of a first color is only projected with a first field of view and light of a second color different from the first color is only projected with a second field of view different from the first field of view.

2. The optical system of claim 1, wherein the at least one switching polarization element is disposed between the projector and the first major surface such that the incident light switches between the first polarization and the second polarization prior to coupling into the light-transmitting substrate.

3. The optical system of claim 1, wherein the at least one switching polarization element includes first and second switching polarization elements and the first switching polarization element is disposed between the LOE and the first polarization grating and the second switching polarization element is disposed between the LOE and the second polarization grating.

4. The optical system of claim 3, comprising:
  a second pair of polarization gratings, a third polarization grating from the second pair disposed on the first side of the light-transmitting substrate corresponding to the first major surface and a fourth polarization grating from the second pair disposed on the second side of the light-transmitting substrate corresponding to the second major surface,
  wherein the at least one switching polarization element includes third and fourth switching polarization elements and the third switching polarization element is disposed between the first polarization grating and the third polarization grating and the fourth switching polarization element is disposed between the second polarization grating and the fourth polarization grating.

5. The optical system of claim 1, wherein the at least one switching polarization element includes first, second, and third switching polarization elements, the first switching polarization element is disposed between the LOE and the first polarization grating, the second switching polarization element is disposed between the LOE and the second polarization grating, and the third switching polarization element is disposed between the projector and the first polarization grating, the first switching polarization element configured to switch in synchronicity to the second and third switching polarization elements.

6. The optical system of claim 1, comprising:
a processor operably connected to the projector and the at least one switching polarization element and configured to time division multiplex polarization of the light between the first polarization and the second polarization at least once an image frame.

7. The optical system of claim 1, wherein the first polarization grating splits unpolarized light incident thereon into portions, the portions are incident on the first major surface, propagate through the substrate, and are incident on the second polarization grating which deflects the portions into light that has an angular direction equal to the light incident on the first polarization grating.

8. An optical system for a near-eye display (NED), the optical system comprising:
a light-guide optical element (LOE) including a light-transmitting substrate having:
first and second major surfaces parallel to each other,
one or more light input coupling elements configured to couple incident light into the light-transmitting substrate thereby trapping the light between the first and second major surfaces by total internal reflection, and one or more light output coupling elements configured to couple the light out of the substrate through the second major surface, wherein the one or more light output coupling elements include partially reflective surfaces that are oriented non-parallel with respect to the first and second major surfaces;
a first active transparent liquid crystal element different from the one or more light output coupling elements and disposed on a first side of the light-transmitting substrate corresponding to the first major surface, the first active transparent liquid crystal element configured to switch polarization of the light from a first polarization to a second polarization different from the first polarization such that the first active transparent liquid crystal element deflects the light of the first polarization in a first direction and the light of the second polarization in a second direction different from the first direction;
a second active transparent liquid crystal element disposed adjacent to the second major surface optically between the one or more light output coupling elements and location corresponding to an eye of a user of the NED, the second active transparent liquid crystal element configured to switch polarization of light incident thereon in synchronicity with the first active transparent liquid crystal element;
a projector configured to emit the incident light, the projector configured to project an image frame divided into at least two sub-frames; and a processor operably connected to the projector and the first active transparent liquid crystal element and configured to time division multiplex polarization of the light between the first polarization and the second polarization synchronized to projection of a first sub-frame and a second sub-frame, respectively, from the at least two sub-frames,
wherein the projector is further configured to project polychromatic images in which light of a first color is only projected with a first field of view and light of a second color different from the first color is only projected with a second field of view different from the first field of view.

9. The optical system of claim 8, comprising:
a processor operably connected to the projector and the first active transparent liquid crystal element and configured to time division multiplex polarization of the light between the first polarization and the second polarization at least once an image frame.

10. An optical system for a near-eye display (NED), the optical system comprising:
a projector configured to emit light corresponding to an image;
a light-guide optical element (LOE) including a light-transmitting substrate having:
first and second major surfaces parallel to each other,
one or more light input coupling elements configured to couple light from the projector into the light-transmitting substrate thereby trapping the light between the first and second major surfaces by total internal reflection, and one or more light output coupling elements configured to couple the light out of the substrate through the second major surface, wherein the one or more light output coupling elements include partially reflective surfaces that are oriented non-parallel with respect to the first and second major surfaces;
a pair of polarization gratings different from the one or more light output coupling elements, a first polarization grating from the pair disposed between the projector and the first major surface and a second polarization grating from the pair disposed between the second major surface and a location corresponding to an eye of a user of the NED; and
at least one switching polarization element configured to switch polarization of the light from a first polarization to a second polarization different from the first polarization such that the second polarization grating deflects the light of the first polarization in a first direction and the light of the second polarization in a second direction different from the first direction; and
wherein the projector is further configured to project an image frame divided into at least two sub-frames,
wherein the optical system further comprises a processor operably connected to the projector and the at least one switching polarization element and configured to time division multiplex polarization of the light between the first polarization and the second polarization synchronized to projection of a first sub-frame and a second sub-frame, respectively, from the at least two sub-frames, and
wherein the projector is further configured to project polychromatic images in which light of a first color is only projected with a first field of view and light of a second color different from the first color is only projected with a second field of view different from the first field of view.

11. The optical system of claim 10, wherein the at least one switching polarization element is disposed between the projector and the first polarization grating.

12. The optical system of claim 10, wherein the at least one switching polarization element includes first, second, and third switching polarization elements, the first switching polarization element is disposed between the LOE and the first polarization grating, the second switching polarization element is disposed between the LOE and the second polarization grating, and the third switching polarization element is disposed between the projector and the first polarization grating, the first switching polarization element configured to switch in synchronicity to the second and third switching polarization elements.

* * * * *